United States Patent [19]

Frazier et al.

[11] Patent Number: 4,729,535
[45] Date of Patent: Mar. 8, 1988

[54] APPARATUS FOR SUPPORTING A COOKING DEVICE

[76] Inventors: Stanley J. Frazier, 1523 125th Ave., SE., Bellevue, Wash. 98005; Blaine F. Sorenson, 18813 SE. Lakeholm Rd., Auburn, Wash. 98002

[21] Appl. No.: 939,550

[22] Filed: Dec. 9, 1986

[51] Int. Cl.⁴ ............................................. A47B 96/06
[52] U.S. Cl. ..................................... 248/230; 126/24; 248/218.4; 248/231.5
[58] Field of Search ...................... 248/230, 231.5, 291, 248/310, 218.4, 284, 285, 287, 457, 149, 150; 114/364; 126/24, 25 A, 30; 108/112, 34, 35

[56] References Cited

U.S. PATENT DOCUMENTS

| 602,122 | 4/1898 | Bragger | 248/230 X |
|---|---|---|---|
| 1,561,432 | 11/1925 | Hitchcock | 248/230 |
| 2,520,412 | 8/1950 | Jensen | 248/278 X |
| 2,743,979 | 5/1956 | Shore | 108/35 X |
| 2,868,598 | 1/1959 | Karoff | 108/112 X |
| 2,934,385 | 4/1960 | Rees | 108/44 |
| 3,032,783 | 5/1962 | Swanson | 248/285 X |
| 3,395,692 | 8/1968 | Johns | 248/125 X |
| 4,042,200 | 8/1977 | Overall | 248/230 X |
| 4,133,466 | 1/1979 | Rosen | 248/310 X |
| 4,194,459 | 3/1980 | Lisowski | 248/230 X |
| 4,270,721 | 6/1981 | Mainor | 248/231.7 X |
| 4,338,875 | 7/1982 | Lisowski | 248/230 X |
| 4,445,495 | 5/1984 | Frost | 248/311.2 X |
| 4,572,081 | 2/1986 | Copeland | 108/112 X |

Primary Examiner—Ramon O. Ramirez
Attorney, Agent, or Firm—Hughes & Cassidy

[57] ABSTRACT

An assembly for supporting a cooking device, such as a barbecue, including a main platform and folding end platforms. The main platform is connected to a shaft which in turn is mounted to a conventional structure such as the rail of a boat by means of a mounting bracket. The support assembly which supports the cooking device thereon, is secured in a level manner above the ground or water. Repositioning of the main platform and end platforms relative to the mounting bracket is accompanied by slidably mounting the main platform to the support shaft. When it is desired to store the support assembly when not in use, the end platforms are folded inward to locations atop the main platform, the mounting bracket and shaft are moved inward toward the main platform, and the support assembly is stored inside the cooking device.

7 Claims, 10 Drawing Figures

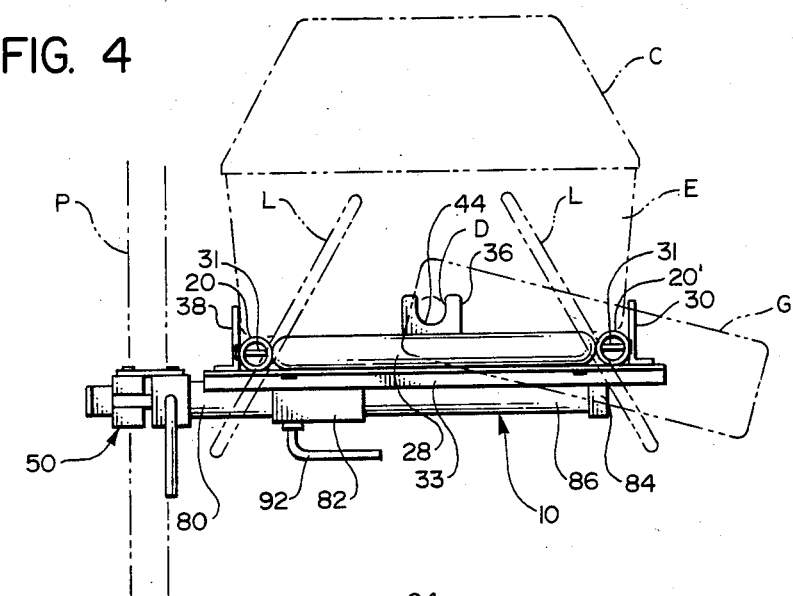
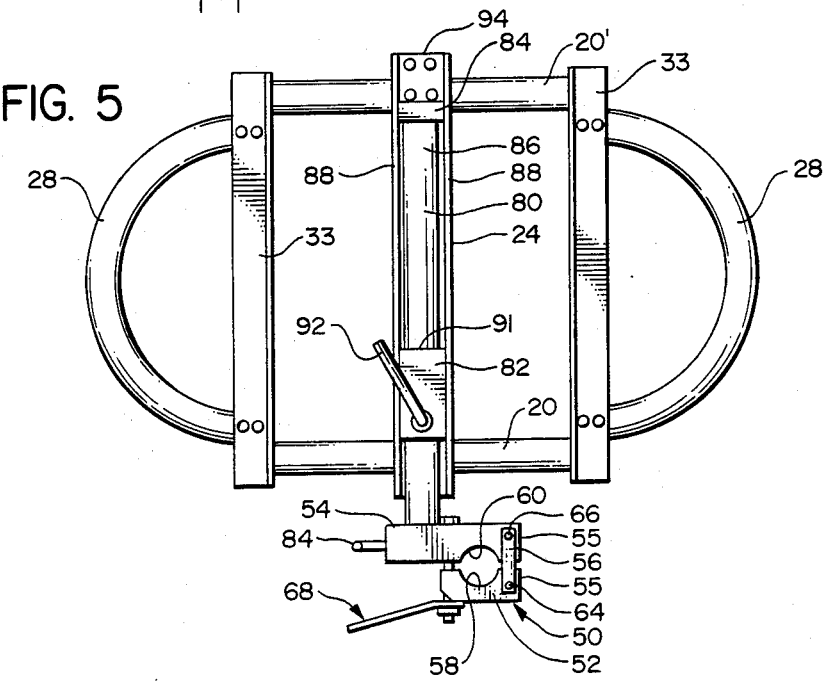

4,729,535

APPARATUS FOR SUPPORTING A COOKING DEVICE

TECHNICAL FIELD

The present invention pertains to an apparatus which is attached to an upstanding structure and which includes a platform for supporting a cooking device such as a portable barbecue.

BACKGROUND OF THE INVENTION

The use of portable barbecues has become increasingly popular in various recreational activities such as recreational vehicle camping and boating. However, due to the mess, inconvenience and hazards associated with these barbecues, their use has been somewhat restricted. For example, when boating, the barbecue is typically set on an outside area of the boat where grease from the cooking often splatters onto the deck. Boaters tend to be conscientious about keeping the boat decks clean, and the splattered grease is not only unsightly but can cause the deck to become slick.

Another problem pertaining to the use of barbecues on boats is the fire danger. When at anchor or moored to a dock, the boat can be rocked by waves or the wash from a passing boat, thereby spilling hot coals onto the deck. If the deck is made of a fire resistant synthetic material, the damage may be limited to a charred deck; however, if the deck is made of wood, a serious fire can result.

As further evidence of the hazards present when barbecuing, it has become increasingly common to prohibit any barbecue activity on wharves or docks. Thus, the boater is becoming increasingly limited to barbecuing on the boat itself.

A conventional cooking device for a boat has been disclosed in U.S. Pat. No. 3,032,783 by Swanson, Jr., in which a cooking grill and basin are extended from a boat over the water by means of a pair of support arms.

Other support apparatus have also been disclosed. For example, in U.S. Pat. No. 1,272,015 by Davis, there is disclosed a pivotable tray support which has a mounting bracket for clamping the tray support to a vertical post of a boat.

A tackle box support, disclosed in U.S. Pat. No. 2,631,807 by Witt, is adapted to be mounted to the sideboard of a boat.

Mollison, in U.S. Pat. No. 2,598,130, as well as Brow in U.S. Pat. No. 2,559,003, disclosed brackets for mounting a lantern to the side of a boat.

In U.S. Pat. No. 2,520,412 by Jensen, there is disclosed a ship's cooker which has a mounting bracket for keeping the cooker suspended in a level manner.

A marine stove which is gimballed to remain in an upright position is disclosed in U.S. Pat. No. 4,445,495 by Frost.

Other support devices are also disclosed in U.S. Pat. No. 4,194,459 and U.S. Pat. No. 4,338,875, both by Lisowski, in which the support devices include clamps for mounting various items to a cylindrical boat rail.

A utility tray which is mounted to the side of a boat is disclosed in U.S. Pat. No. 2,934,385 by Rees.

And, in U.S. Pat. No. 3,395,692 by Johns, there is disclosed a collapsible portable grill and grill support for suspending the grill above an open fire or fireplace.

SUMMARY OF THE INVENTION

The present invention pertains to a support assembly for supporting a cooking device, such as a barbecue, above the ground, water or the like. The support assembly includes a main platform and a pair of folding end platforms. The main platform is connected to a shaft which in turn is mounted by an attachment bracket to an upstanding structure such as the rail of a boat. The support assembly, which is secured in a level manner above the ground or water, supports the cooking device thereon. Repositioning of the support assembly toward or away from the upstanding structure is provided by slidably mounting the main platform to the support shaft by means of a mounting assembly.

When it is desired to store the support assembly when not in use, the end platforms are folded inwardly to locations adjacent to the main platform and the support shaft and attachment bracket are moved inward toward the main platform.

More specifically, the present invention pertains to apparatus for supporting a cooking device from a structure. The cooking device has a bottom, upstanding sidewalls and upstanding end walls which have interior surfaces which form an interior chamber with a first lengthwise dimension and a second transverse dimension. The apparatus includes means for supporting the cooking device; the supporting means including a main support platform having a first end and a second end. The main support platform engages at least a portion of the cooking device thereon. The supporting means also includes a first end platform which is pivotally connected to the first end of the main support platform, and a second end platform which is pivotally connected to the second end of the main support platform. The first and second end platforms are pivotally connected to the main support platform for movement between (i) a first open position in which the first and second end platforms extend horizontally outward from the first and second ends, respectively, to support additional portions of the cooking device thereon, and (ii) a folded position where the first and second end platforms extend inward of the main support platform. The support assembly also includes means for connecting the supporting means to the structure in a manner to support the cooking device in a level manner.

It is an object of the present invention to provide a platform for supporting a conventional portable cooking device, such as a barbecue, from an upstanding structure.

BRIEF DESCRIPTION OF THE DRAWINGS

These and other objects and advantages of the present invention will become more readily apparent upon reading the following Detailed Description and upon reference to the attached Drawings, in which:

FIG. 4 is an end elevational view of the support assembly in solid lines and showing a conventional barbecue as well as a conventional upright structure in phantom lines;

FIG. 5 is a bottom view of the support assembly in a retracted position;

Figure 1:
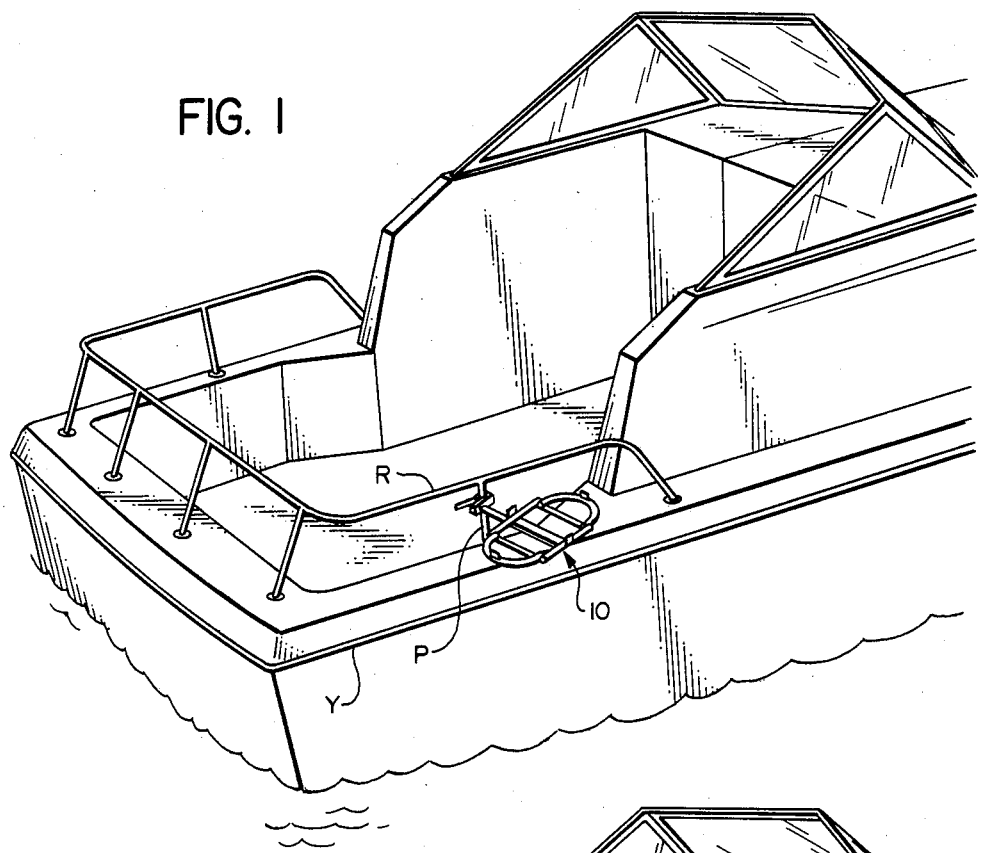
FIG. 1 is an isometric view of the support assembly of the present invention which is attached in an exemplary manner to the vertical post of a boat rail.

While the present invention is susceptible of various modifications and alternative forms, specific embodiments thereof have been shown by way of example in the Drawings and will be described herein in detail. It should be understood, however, that it is not intended to limit the invention to the particular forms disclosed, but on the contrary, the intention is to cover all modifications, equivalents and alternatives falling within the spirit and scope of the invention.

DETAILED DESCRIPTION

The present invention pertains to an assembly for supporting a conventional cooking device, such as a barbecue, at a desired location. In an exemplary embodiment the support assembly is particularly adapted for use with a boat where it is supported over the water. It should be appreciated however, that the support assembly of the present invention may be attached to other structures such as a mobile home or recreational vehicle in order to support a cooking device, such as a barbecue or the like, at desired locations from these vehicles.

Figure 2:
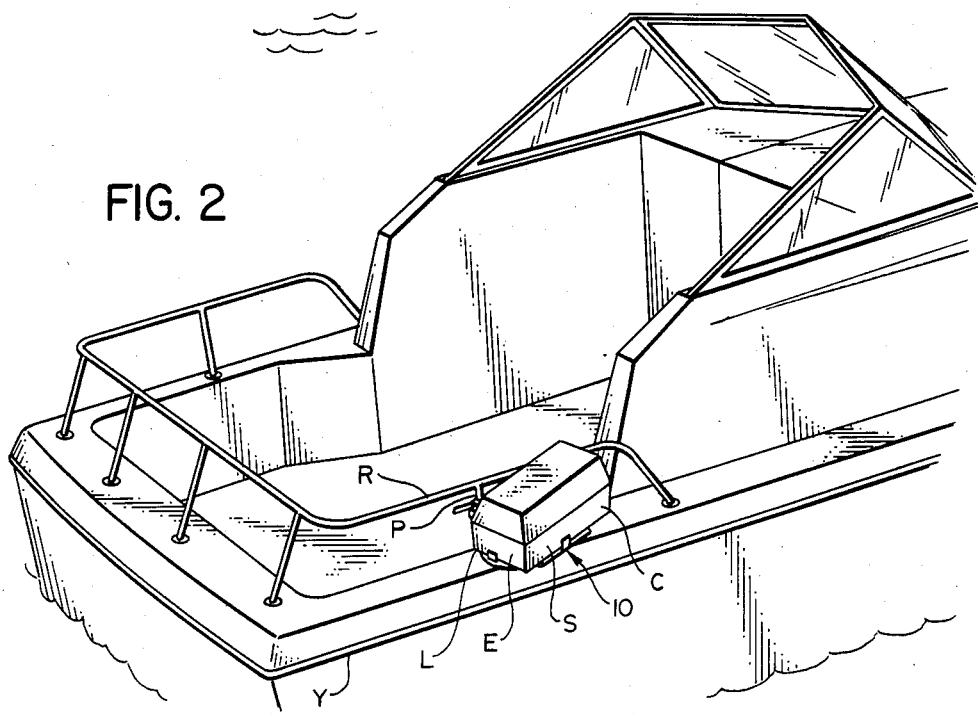
FIG. 2 is a view similar to FIG. 1 which shows the support assembly of the present invention in an exemplary embodiment for supporting a conventional portable barbecue.

Referring now to FIG. 1, there is shown in an exemplary embodiment the support assembly of the present invention indicated at 10, attached to a vertical post P of a boat rail R which extends around the rear perimeter of a boat indicated by the letter Y. The support assembly 10 has a platform configuration which extends in a horizontal manner outward from the side of the boat and over the water, and further includes a lengthwise axis designated by the number 12 (FIG. 3) and a transverse axis designated by the number 14. As shown in FIG. 2, a conventional cooking apparatus such as a barbecue C, having opposing ends E, opposing sides S and a bottom L, is supported on the support platform 10; the cooker C also being supported outwardly from the boat and over the water.

Figure 3:
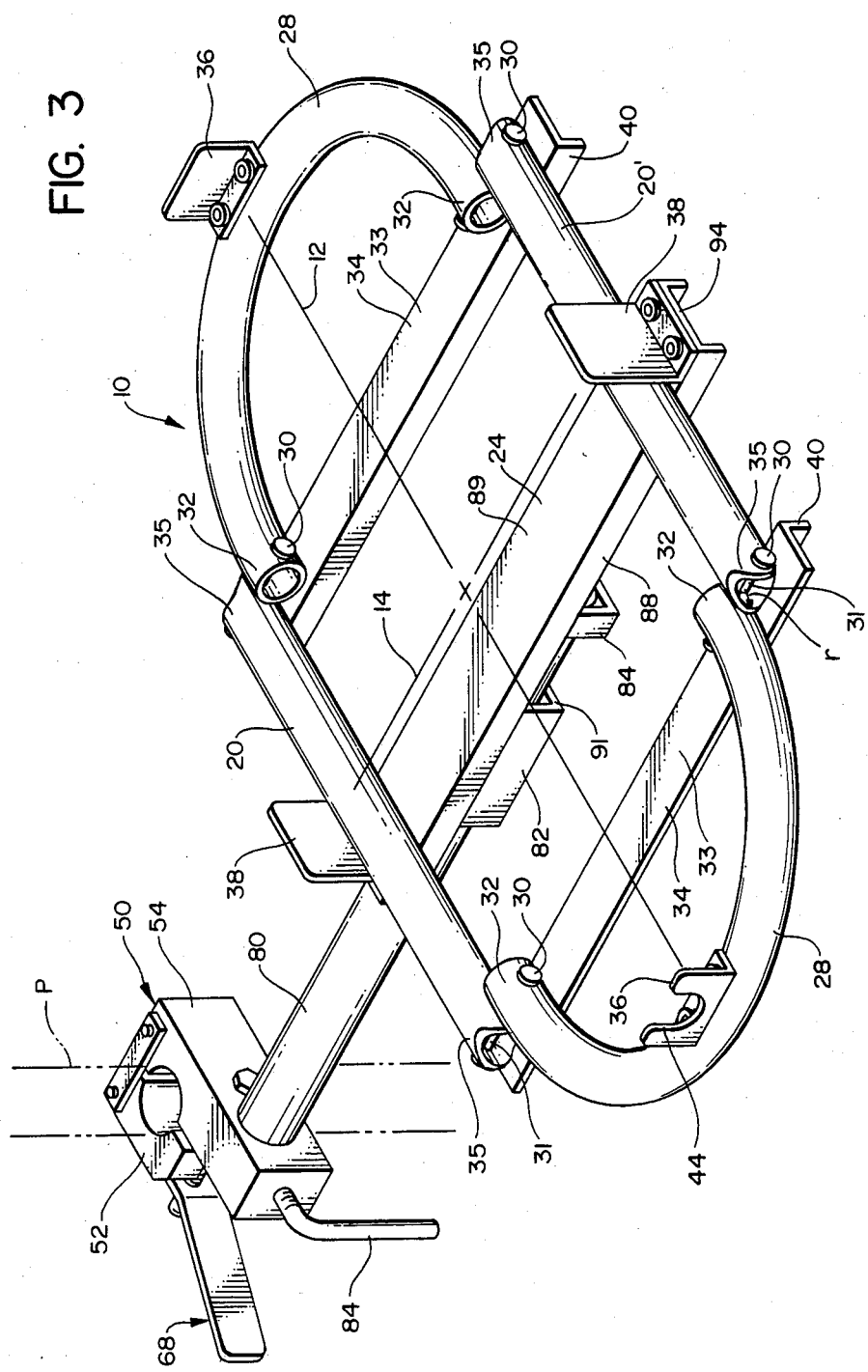
FIG. 3 is a detailed isometric view of the support assembly of the present invention.

In order to support the cooker C, the support assembly 10, as shown in FIG. 3, includes a main platform which is formed by a pair of spaced apart parallel lengthwise extending inner, outer horizontal tubes 20, 20', respectively, which are connected at their respective middles by a transverse middle bar 24 which is fastened by rivets or the like to the bottom surfaces of the side tubes 20. The support assembly 10 is further formed by left, right semi-circular end platforms 28 which are attached to the left, right ends of support tubes 20, respectively, by means of left, right transverse fastener pins 30. More specifically, the semi-circular platforms 28 have tubular configurations which terminate at parallel lengthwise extending end segments 32. End segments 32 are mounted adjacent to and inward of the tubular supports 20 so that the upper surface of the tubular supports 20 and the upper surface of the semi-circular end platforms 28 form a continuous level plane when the apparatus is in an unfolded position shown in FIG. 3. The fastener pins 30 include shafts 31 which extend transversely through the side tubes 20 and through the adjacent end segments 32.

The left, right end platforms 28 are supported in the unfolded horizontal position by means of left, right end bars 33 which are fastened to the bottom surfaces of the end segments 32 in a manner parallel to middle bar 24. More specifically, each end bar 33 includes a horizontal flange portion 34; the upper surface of which engages the lower surfaces of the end tubes 20 at their ends 35 when the end platforms are in the unfolded position. In order to permit the end platforms 28 to be pivoted to the folded position, the ends 35 of the side tubes 20 have a rounded, semi-circular configuration which define a selected radius r (FIG. 3) from the shafts 31 of fastener pins 30. The radius r is less than the distance from the fastener pin shafts 31 to the top surfaces of the end bars 33. The rounded configurations of the ends 35 permit the end bars 33 to rotate upward and around the outer circumference of the ends 35 when the end platforms 28 are moved to a folded position shown in FIG. 8.

Figure 8:
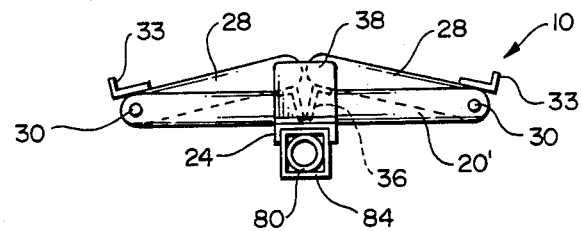
FIG. 8 is a side view of the support assembly in a folded position.

In order to store the support assembly 10 when not in use, the end platforms 28 may be moved from the unfolded position to the folded position (FIG. 8). This is accomplished by rotating the end platforms 28 inward about the fastener pins 30 to a location where the outer ends of the end platforms 28 are generally adjacent to the middle bar 24. In this manner, the lengthwise dimension of the support 10 in the folded position is equal to the lengthwise distance between the ends 35 of side tubes 20.

Further support for the cooker C is provided by left, right end tabs 36 (FIG. 3) which are mounted to the ends of the left, right end platforms 28. Each end tab 36 has a tranverse planar upward extending portion and a lower horizontal base which is riveted to the top surface of the end support 28. Side tabs 38, which have similar configurations to tabs 36, are also mounted to the upper surface of the middle bar 24 adjacent to and outside of each side tube 20. The end tabs 38 include upward lengthwise extending planar portions which prevent the cooker C from moving in a transverse direction, whereas the end tabs 36 prevent the cooker C from moving in the lengthwise direction.

In an exemplary embodiment, the end tabs 36, 38 form a somewhat rectangular holder which engages the rectangular base of a conventional portable barbecue to secure the barbecue to the support 10. In this manner, the bottom of the cooker C is supported on the upper surfaces of the side tubes 20 and the end platforms 28. When the support assembly is in its folded position shown in FIG. 8, the upper edges of the end tabs 36 engage the upper surface of the middle bar 24 so that the end supports 28 form an angle of about 15° with the plane of the side tubes 20.

Additional longitudinal structural support is provided to the end bars 33 (FIG. 3) by transverse edge segments 40 which extend downward from the edges of the horizontal flange portions 34 of the end bars.

In the event the cooker C is heated by propane gas or the like, a conventional gas cylinder G (FIG. 4) is attached to an end of the cooker C and by means of a conduit D which extends in a lengthwise manner. In order to accommodate the conduit D, either the left or right end tab 36 includes a slot 44 in its upper edge. The slot 44 not only permits the cooker C to be supported in a level manner, but in addition it further secures the cooker C against unwanted transverse movement on the support 10.

In conventional use, cooker C is supported on the ground or floor by front and rear legs L which are pivotally connected to opposite ends of the cooker (FIG. 4). More specifically, each leg L has a U-shaped configuration with vertical supports which are pivotally fastened to the ends E of the cooker. In conventional operation, the legs L pivot downward below the bottom of the cooker to support the cooker above the ground. In the present invention, however, prior to placing the cooker on the support 10, the legs are lowered to their conventional support positions shown in FIG. 4, and the cooker is slid horizontally over to the support 10 so that the main platform and end platforms are positioned between the lower horizontal rungs of the legs and the bottom of the cooker. Any force which would tend to upset the cooker C, causes the vertical supports or lower rungs of the legs to engage the support 10, and thereby stabilize the cooker.

Figure 9:
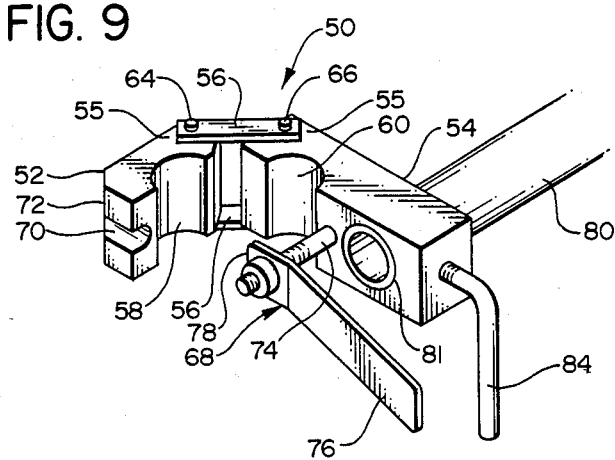
FIG. 9 is an isometric view of an exemplary mounting bracket portion of the support assembly.

A further feature of the present invention is the mounting of the support 10 to an upstanding structure so that the cooker C may be supported above any underlying surface, such as the ground, water, or the like. This is accomplished by a mounting bracket indicated at 50 in FIG. 4, and which in an exemplary embodiment is shown to be attached to an upstanding cylindrical pole P. As shown more clearly in FIGS. 5 and 9, mounting bracket 50 includes a first end clamp 52 which is pivotally connected to an opposing end clamp 54 by means of upper and lower mounting bars 56. More specifically, the end clamp 52 includes a semi-circular vertical slot 58 at its inner surface which together with an opposing vertical semi-circular slot 60 of end clamp 54 engages the outer surface of the pole P as shown in FIG. 4. Support for pivotal movement of the end clamp 52 between an open position shown in FIG. 9, and the closed position shown in FIG. 5, is provided by the upper and lower mounting bars 56 being pivotally mounted to the upper and lower horizontal surfaces of the end clamps 52, 54 at their respective pivoting ends 55. More specifically, a first vertical fastener pin 64 pivotally connects the upper, lower bars 56 to the end clamp 52, and a second vertical fastener pin 66 pivotally connects the upper, lower mounting bars 56 to the end clamp 54.

The end clamp 52 is held in the closed position about the pole P by the upper and lower mounting bars 56 which are positioned at one side of the slots 58, 60, and a closing lever assembly indicated at 68 which is mounted to the end clamp 54 at the opposite side of the slots 58, 60. More specifically, the lever assembly 68 includes a shaft 74 which extends in a horizontal manner from the engaging end inner surface of the end clamp 54. The shaft 74 includes a lever 76 pivotally mounted to the outer end of the shaft 74. When the end clamp 52 is closed, the shaft 74 is engaged within a horizontal semi-circular slot 70 at the engaging end 72 of the end clamp 52. The lever 76 includes an engaging end 78 which engages the outer surface of the end clamp 52 when the end clamp 52 is in the closed position. This is accomplished by securing the end clamp 52 around the pole P with the handle in a vertical position, and then rotating the handle to a horizontal position so that the engaging end 78 is engaged over the top surface of the end clamp 52.

Connection of the mounting bracket 50 to the remainder of the support assembly 10 is accomplished by means of a horizontal cylindrical shaft 80 (FIG. 9) which extends through a cylindrical passageway 81 which in turn extends between the inner and outer surfaces of the end clamp 54. The shaft 80 is rotatably mounted within the passageway 81 to permit the mounting bracket 50 to be mounted to any pole P, whatever its angle of inclination, while still maintaining the support assembly 10 in a level manner. The shaft 80 is secured at the desired rotational location within the passageway 81 by means of a securing handle 84 which is threaded within a hole in end clamp 54 which is perpendicular to the shaft 80; the threaded end of handle 84 engaging the outer surface of the shaft 80.

Figure 6:
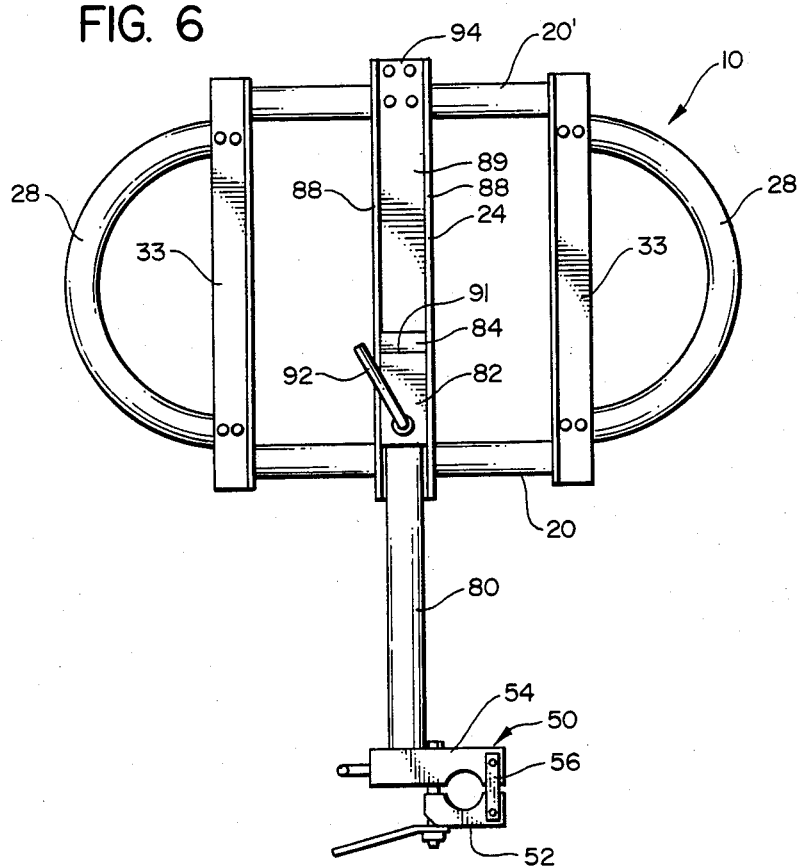
FIG. 6 is a bottom view of the support assembly in an extended position.
Figure 7:
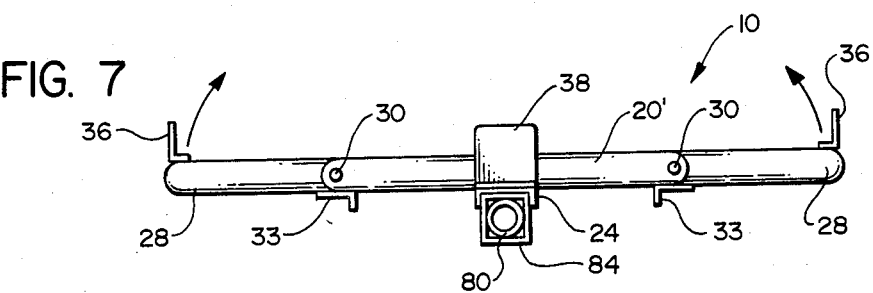
FIG. 7 is a side view of the support assembly in an open unfolded position.

A further feature of the present invention is the location of the support assembly 10 at selected distances from the mounting bracket 50 as shown in FIGS. 5 and 6. This is accomplished by slidably connecting the support shaft 80 to the main support bar 24. More specifically, the shaft 80 is slidably engaged within a sleeve 82 which is fastened to the bottom surface of the middle bar 24. The support shaft 80 includes an upstanding square shaped guide shoe 84 which is rigidly fastened to the shaft's outer end 86. The shoe 84 is slidably engaged within a complementary shaped channel of the middle bar 24 formed by the bottom horizontal surface of the bar together with the inner surfaces of a pair of transversely extending edges 88 which depend downward from a horizontal portion 89 (FIG. 3). The aforementioned configuration of the shoe 84 and middle bar 24 prevents the unwanted rotation of the support platform 10 about its transverse axis, and thus stabilizes the support platform in a level manner.

Outward slidable movement of the main bar 24 along the shaft 80 to an extended position shown in FIG. 6 is limited by the engagement of the shoe 84 with an outer end 91 of the sleeve 82. It can be appreciated that the extended position is preferred for cooking operations because it places the barbeque at the furthest location from the boat. An L-shaped securing handle 92 includes a threaded end which extends upward through the sleeve 82 so that rotation of the handle 92 causes the threaded end to engage the shaft 80 to lock the main platform at the selected distance from mounting bracket 50. This also secures the shaft 80 against unwanted rotation about the transverse axis.

Figure 10:
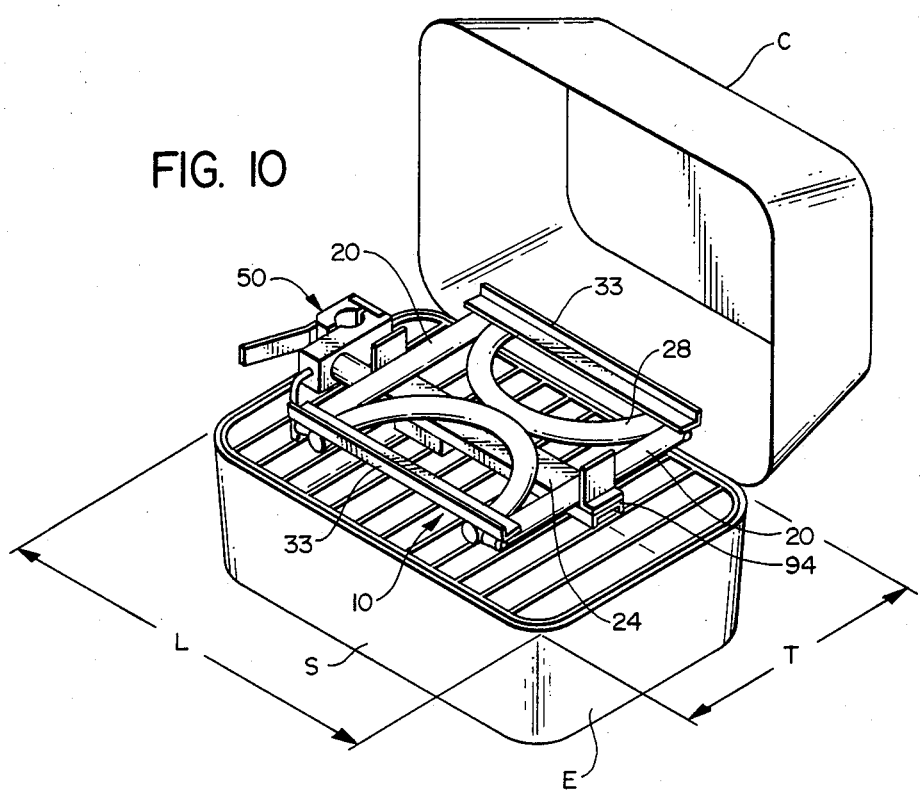
FIG. 10 is an isometric view showing the storage of the support assembly inside a conventional barbecue.

An advantage of the present invention is the ability (i) to fold the end platforms 28 to the closed position shown in FIG. 8, and (ii) to slide the mounting bracket 50 and shaft 80 inward to the retracted location adjacent the inner side tube 20 shown in FIG. 5, and thereby store the support assembly inside the cooker as shown in FIG. 10. In a preferred embodiment, the folded lengthwise dimension of the support 10 is less than the inside transverse dimension T of cooker C. Furthermore, when the mounting bracket 50 and shaft 80 are in the retracted location, the distance between the mounting bracket 50 and the outer end 94 of the middle bar 24 is less than the inner lengthwise dimension L of cooker C. This permits the folded support assembly 10 to be stored inside the cooker C in a manner that the transverse axis of the support assembly is parallel to sides S of the cooker.

What is claimed is:

1. Apparatus for supporting a cooking device from a structure, the cooking device having a bottom, upstanding sidewalls and upstanding endwalls which have an interior surface which form an interior chamber with a first lengthwise dimension and a second transverse dimension, said apparatus comprising:

a. means for supporting the cooking device, said supporting means including
  (1) a main support platform having a first end and a second end, said main support platform adapted to support at least a portion of the cooking device thereon,
  (2) a first end platform which is pivotally connected to the first end of said main support platform, and a second end platform which is pivotally connected to the second end of said main support platform, said first and second end platforms being pivotally connected to said main support platform for movement between (i) an unfolded position in which said first and second end platforms extend horizontally outward from said first and second ends, respectively, to support additional portions of the cooking device thereon, and (ii) a folded position where said first and second end platforms extend inward of said main support platform from the first and second ends, respectively, each of said end platforms further including an engaging member which is mounted to a bottom of said end platform in a manner that said engaging member engages a bottom of said main platform when said end platform is in the unfolded position to support said end platform in the horizontal manner, and said first and second ends of said main platform further having rounded portions which permit said engaging members to pivot about said first and second ends when said first and second end platforms are rotated between the folded and unfolded positions; and
b. means for connecting said supporting means to the structure in a manner to support the cooking device in a level manner.

2. The apparatus as set forth in claim 1 wherein:
a. said first and second end platforms are connected to the first and second ends, respectively, of said main platform by first and second pivot connectors, respectively;
b. the rounded portions of said first and second ends each have a radius r which is measured from the first and second pivot connectors, respectively; and
c. said first and second engaging members are connected to said bottom surfaces of said first and second end platforms, respectively, at a distance from said first and second pivot connectors, respectively, which is greater than r.

3. The apparatus as set forth in claim 1 wherein said first and second end platforms are pivotally connected to said main support platform in a manner that when said first and second end platforms are in the folded position the supporting means has a lengthwise dimension which (i) is substantially equal to a lengthwise dimension of said main support platform, and (ii) which is less than the transverse dimension of the cooking device interior chamber so as to permit the supporting means to be stored inside the cooking device interior chamber.

4. Apparatus for supporting a cooking device from a structure, the cooking device having a bottom, and upstanding sidewalls and upstanding endwalls which have interior surfaces which form an interior chamber with a first lengthwise dimension and a second transverse dimension, said apparatus comprising:
a. means for supporting the cooking device, said supporting means including
  (1) a main support platform having a first end and a second end, said main support platform adapted to support at least a portion of the cooking device thereon,
  (2) a first end platform which is pivotally connected to the first end of said main support platform, and a second end platform which is pivotally connected to the second end of said main support platform, said first and second end platforms being pivotally connected to said main support platform for movement between (i) an unfolded position in which said first and second end platforms extend horizontally outward from said first and second ends, respectively, to support additional portions of the cooking device thereon, and (ii) a folded position where said first and second end platforms extend inward of said main support platform from the first and second ends, respectively; and
b. means for connecting said supporting means to the structure in a manner to support the cooking device in a level manner, said connecting means includes
  (1) shaft means,
  (2) first means for mounting said shaft means to said structure to support said shaft means in a level manner, and
  (3) second means for mounting said main support platform to said shaft means, said second mounting means including sleeve means which are fastened to said main support platform and which are slidably engaged about said shaft means to secure said supporting means to said shaft means and to permit slidable movement of said supporting means in a first outward direction from said first mounting means and a second inward direction toward said first mounting means.

5. The apparatus as set forth in claim 4 wherein said second mounting means further includes
  (1) a channel which is formed by first and second side edges which extend downward from a bottom surface of said main support platform, and
  (2) a guidable shoe member which is attached to an outer end portion of said shaft means and which engages said first and second side edges of said channel to inhibit rotation of said main support platform about said shaft means.

6. The apparatus as set forth in claim 5 wherein said sleeve means is fastened to said main support platform between said guidable shoe member and said first mounting means so as to engage said guidable shoe member during movement of said support platform in the first outward direction to prevent further outward movement of said support platform.

7. The apparatus as set forth in claim 6 wherein said first mounting means includes
  (1) first clamp means which are rotatably mounted to said shaft means to permit selected rotational movement of said supporting means, said first clamp means having a first surface,
  (2) second clamp means which are pivotally connected to said first clamp means and which have a second surface, said first and second clamp means being movable between a first closed position where the first and second surfaces are engaged about the structure, and a second open position, and
  (3) means for securing said first and second clamp means in the closed position.

* * * * *